United States Patent Office 3,578,650
Patented May 11, 1971

3,578,650
METHOD FOR CARRYING OUT REACTIONS OF UNSATURATED HYDROCARBONS AT LOW TEMPERATURES
Maurice M. Mitchell, Jr., Wallingford, Pa., Harold M. Fisher, Redstone Arsenal, Ala., and Edward S. J. Tomezsko, Media, Pa., assignors to Atlantic Richfield Company, New York, N.Y.
No Drawing. Filed Feb. 20, 1969, Ser. No. 801,205
Int. Cl. C07c 5/10, 15/00; C08f 29/00
U.S. Cl. 260—93.7
3 Claims

ABSTRACT OF THE DISCLOSURE

Method for carrying out alkylation, polymerization or hydrogenation reactions of unsaturated hydrocarbons by contacting the unsaturated hydrocarbon such as an olefin or aromatic or combination thereof with tungsten hexafluoride at temperatures between 0° C. and 50° C.

BACKGROUND OF THE INVENTION

Field of the invention

This invention relates to a method for carrying out reactions of unsaturated hydrocarbons, in particular alkylation reactions, polymerization reactions and hydrogenation reactions of aromatic hydrocarbons and olefinic hydrocarbons or with combinations thereof by contacting such hydrocarbons with tungsten hexafluoride as the catalyst at low temperatures of the order of 0° C. to 50° C. and preferably from about 25° C. to 35° C.

Prior art

Polymerization of unsaturated hydrocarbons such as ethylene with tungsten hexachloride to produce solid polymers has been described in numerous literature and patent references. The use of such compound in combination with aluminum alkyls and similar types of catalysts has also been described. No prior art is known, however, which shows the use of tungsten hexafluoride as the catalyst for carrying out alkylation, polymerization or hydrogenation reactions with unsaturated hydrocarbons at low temperatures, i.e. of the order of room temperature or slightly above. For example, the alkylation of aromatic hydrocarbons with olefins or with alkyl chlorides is ordinarily carried out at about 60° C. on a commercial basis. Hydrogenation of unsaturated hydrocarbons likewise is either carried out at elevated temperatures or at elevated pressures or a combination of both.

The present invention differs from the prior art in that these reactions of unsaturated hydrocarbons can be carried out at or near room temperature and at atmospheric pressure or at pressures slightly above atmospheric pressure.

SUMMARY OF THE INVENTION

In accordance with this invention there is provided a method for carrying out alkylation, polymerization and hydrogenation reactions of unsaturated hydrocarbons at low temperatures by contacting the hydrocarbons with tungsten hexafluoride.

In is an object of this invention therefore to provide a method for carrying out reactions of unsaturated hydrocarbons at low temperatures in the presence of tungsten haxafluoride.

It is another object of this invention to provide a method for alkylating aromatic hydrocarbons at low temperatures.

It is another object of this invention to provide a method for polymerizing unsaturated hydrocarbons at low temperatures.

It is an additional object of this invention to provide a method for hydrogenating unsaturated hydrocarbons at low temperatures.

Additional objects of this invention will be apparent from the following description of the preferred embodiments and from the claims.

DESCRIPTION OF THE PREFERRED EMBODIMENTS

The unsaturated hydrocarbons to which this invention is particularly applicable include hydrocarbons having one or more olefinic double bonds in the molecule and can be straight, branched chain or cyclic and in the case of the di- or polyolefins can be either conjugated or non-conjugated. The aromatic hydrocarbons to which the invention is applicable include the mononuclear aromatics such as benzene, toluene, the xylenes and higher alkylated benzenes.

It is also applicable to such compounds as tetrahydronaphthalene, indene and the like. It is particularly useful for polynuclear aromatics such as naphthalene, phenanthrene, acenaphthylene and the like. The catalyst employed is tungsten hexafluoride which can be introduced either as a gas since it is gaseous at ambient conditions of temperature and pressure or as a liquid under a small amount of pressure, i.e. about 7 to 8 pounds per square inch gauge. Tungsten hexafluoride melts at 1.9° C. and boils at 17.1° C. so that it can be used as a liquid at the low temperatures utilized for the reactions of this invention.

In carrying out alkylation reactions in accordance with this invention any of the aromatic hydrocarbons mentioned can be employed. These include benzene, toluene, the xylenes, ethylbenzene, cumene, n-propylbenzene and other mono- or polyalkyl benzenes, naphthalenes, phenanthrenes, and the like.

The olefins which can be utilized to alkylate these hydrocarbons include the monoolefins ranging from 2 to 20 carbon atoms or more such as ethylene, propylene, butylenes, amylenes, hexenes, heptenes, and the like. They can be straight chain olefins such as those obtained by wax cracking or the dehydrohalogenation of chlorinated paraffins or they may be branched chain such as those obtained by the polymerization of propylene. Other olefins which can be employed include the conjugated diolefins such as butadiene and isoprene or the non-conjugated diolefins such as 1,4-pentadiene, 1,5-hexadiene and the like. In addition cyclic olefins such as cyclohexene, cycloheptene, 4-methylcyclohexene and the like, can be employed.

The preferred method for carrying out the reaction is to introduce the catalyst into the aromatic hydrocarbon either by admixing the hydrocarbon and catalyst as liquids under moderate pressure or by adding the gaseous catalyst to the hydrocarbon until it has dissolved therein. The olefin is then added to the hydrocarbon catalyst mixture. In general, the reaction is extremely rapid even at temperatures of 25° C. to 35° C.

Under the foregoing conditions there is produced both the alkylated benzene and an olefin polymer. The relative amounts of alkylate and polymer have been found to be a function of chain length when the reaction is carried out in a hydrogen atmosphere. This is shown in the following example.

EXAMPLE I

A series of runs was carried out wherein benzene was reacted with various olefins. The reaction was carried out by filling a glass tube (90 ml. volume) with hydrogen and then introducing tugnsten hexafluoride to give a total pressure of about 60 p.s.i.g. Benzene was introduced into the tube in an amount of about 0.11 mole. The tungsten hexafluoride forms a complex with the benzene as shown by the development of a reddish color. The olefin was introduced in an amount of 0.11 moles and the contact time was 24 hours. Results obtained are shown in the table.

| Olefin: | Percent selectivity [1] |
| --- | --- |
| Ethylene | 1.0 |
| Propylene | 26.5 |
| Butene-1 | 7.8 |
| Cis-butene-2 | 10.9 |
| Trans-butene-2 | 34.9 |
| Octene-1 | >90 |
| Cyclohexene | >90 |

[1] See following equation:

$$\text{percent selectivity} = \frac{\text{moles alkylate produced}}{\text{total moles olefin consumed}} \times 100$$

It will be seen that as the chain length increases the alkylation reaction predominates.

Although a contact time of 24 hours was employed, it was noted that the reaction was extremely rapid, the olefin reacting almost as fast as it was introduced. The long time was utilized merely to insure complete reaction for purposes of determining the equilibrium.

EXAMPLE II

A run was carried out similar to that in Example I using toluene and propylene except that the temperature was 25° C. Under these conditions a conversion of 39.1 percent was obtained, i.e. moles of alkylate produced per moles of olefin charged, multiplied by 100. In this product the isomer distribution was 44.0 weight percent ortho, 22.3 weight percent metal and 33.7 weight percent para.

The polymerization reaction can be carried out with monoolefins, diolefins and polyolefins having from 2 to 10 carbon atoms. In particular, olefins having from 2 to 5 carbon atoms can be polymerized readily. The polymerization reaction is carried out in much the same manner as the alkylation reaction. The olefin is introduced into the catalyst which may be either in the gaseous phase or the liquid phase depending on the temeprature and pressure. As in the alkylation reaction the polymerization reaction is extremely rapid.

EXAMPLE III

Runs were carried out at 25° C. to 35° C. utilizing both argon and hydrogen as the inert atmosphere. The olefins employed were $C_2$ to $C_4$. In hydrogen no hydrogenation of the olefin was detected. The polymer chain length decreased with increasing molecular weight of the olefin, thus when ethylene was polymerized a chain length of approximately 1000 units was obtained whereas with a $C_4$ olefin the chain length was only about 100 units. The chain length was the same for both cis- and trans-butene-2 polymer in the gas phase reaction.

EXAMPLE IV

Runs were carried out at 25° C. to 35° C. using benzene as the solvent for the tungsten hexafluoride catalyst as in Example I, but in these runs argon was utilized as the atmosphere. In these runs the extent of alkylation and polymerization were equivalent for the $C_2$ to $C_4$ olefins. It was found that the length of the polymer chain decreased with increasing molecular weight of the olefin as in the case of the gas phase reaction.

EXAMPLE V

Acenaphthylene was contacted with tungsten hexafluoride in benzene solution at 25° C. to 35° C. It was found that a polymer was formed having a molecular weight of about 6000 and a melting point in excess of 300° C. Similar results were found when carbon tetrachloride was used as the solvent for the catalyst.

EXAMPLE VI

Phenanthrene was introduced into a benzene solution of tungsten hexafluoride under an argon atmosphere. In this reaction there was formed 9,10-dihydrophenanthrene. It was believed what the source of the hydrogen was from another phenanthrene molecule and that there was produced as a result dimers of phenanthrene although these could not be observed. Temperatures of 25° C. and higher were effective for this reaction.

When hydrogen was utilized as the atmosphere, increased hydrogen pressure retarded the reaction. For example, at 1 atmosphere of hydrogen pressure a yield of 46 percent of the 9,10-dihydrophenanthrene was obtained, whereas at 2.5 atmospheres of hydrogen pressure a yield of only 25 percent was obtained.

EXAMPLE VII

When cyclohexene was contacted with molecular hydrogen using the tungsten hexafluoride catalyst there was produced a small amount of n-hexane together with the cyclohexane Thus in a typical run a 1 molar solution of cyclohexene in carbon tetrachloride containing a small amount of tungsten hexafluoride was rapidly converted to n-hexane in a 3 percent yield in a hydrogen atmosphere. If the reaction is allowed to proceed for more than a few minutes the n-hexane disappears and a complex product is obtained.

EXAMPLE VIII

It was found that when cyclohexene was hydrogenated utilizing a benzene solution of tungsten hexafluoride as the catalyst there was found in addition to the cyclohexane, cyclohexyl benzene. Cyclohexyl benzene was also obtained when argon was utilized as the atmosphere instead of hydrogen. There was also found in this reaction the small yield of n-hexane.

The foregoing examples demonstrate that the process of this invention can be utilized for carrying out the various reactions described for the described unsaturated hydrocarbons to give predictable products and also as shown in the examples, products which were entirely unexpected.

We claim:
1. A method for carrying out polymerization of olefinic hydrocarbons, which comprises contacting an olefinic hydrocarbon with tungsten hexafluoride at a temperature between 0° C. and 50° C.
2. The method according to claim 1 wherein the reaction is polymerization of an olefinic hydrocarbon having from 2 to 10 carbon atoms.
3. The method according to claim 2 wherein the olefin contains from 2 to 4 carbon atoms and the reaction temperature is from 25° C. to 35° C.

References Cited

Friedel-Crafts and Related Reactions, vol. I, Interscience Publishers, New York, 1965, p. 275, QD 501 066 C. 3.

JOSEPH L. SCHOFER, Primary Examiner

A. HOLLER, Assistant Examiner

U.S. Cl. X.R.

260—94.9, 666, 667, 671, 93.5